United States Patent [19]
De Vaan

[11] Patent Number: 5,798,866
[45] Date of Patent: Aug. 25, 1998

[54] PICTURE DISPLAY DEVICE WITH TWO MICROLENS ARRAYS

[75] Inventor: Adrianus J. S. M. De Vaan, Eindhoven, Netherlands

[73] Assignee: U.S. Philips Corporation, New York, N.Y.

[21] Appl. No.: 764,836

[22] Filed: Dec. 12, 1996

[30] Foreign Application Priority Data

Dec. 22, 1995 [EP] European Pat. Off. ............ 95203612

[51] Int. Cl.⁶ ............................................. G02B 27/10
[52] U.S. Cl. .................... 359/621; 359/622; 359/623; 359/624
[58] Field of Search ............................ 359/621, 622, 359/623, 624

[56] References Cited

U.S. PATENT DOCUMENTS

| | | | |
|---|---|---|---|
| 3,941,475 | 3/1976 | Sheets | 362/268 |
| 4,626,082 | 12/1986 | Mochizuki et al. | 350/167 |
| 5,098,184 | 3/1992 | Van Den Brandt et al. | 353/102 |

FOREIGN PATENT DOCUMENTS 2262185  10/1990  Japan.
07181487A  7/1995  Japan.

*Primary Examiner*—Frank G. Font
*Assistant Examiner*—Reginald A. Ratliff
*Attorney, Agent, or Firm*—F. Brice Faller

[57] ABSTRACT

Picture display device (1) comprising an illumination system (3) provided with a light source (5) for generating a light beam. The device (1) also comprises a picture display panel (9) having a matrix of pixels (10) for modulating said light beam in conformity with picture information to be displayed. A first microlens array (13) having a plurality of first lenses (15) and a pitch $\Delta w_1$ is present between the illumination system (3) and the picture display panel 9. A second microlens array (17) having a plurality of second lenses (19) and a pitch $\Delta w_2$ is present between the first microlens array (13) and the picture display panel (9). The focal planes of the two microlens arrays coincide and $\Delta w_1 = \Delta w_2 = \Delta_w$ applies to the pitches. The first lenses (15) have dimensions which are substantially equal to the dimensions of the second lenses (19). The illumination system (3) is adapted in such a way that the illumination system, when being in operation, supplies a plurality of sub-beams which are incident on the first microlens array at different, well-defined angles.

14 Claims, 12 Drawing Sheets

PICTURE DISPLAY DEVICE WITH TWO MICROLENS ARRAYS

BACKGROUND OF THE INVENTION

The invention relates to a picture display device comprising an illumination system provided with a light source for generating a light beam, and a picture display panel having a matrix of pixels for modulating the light beam in conformity with picture information to be displayed. A first microlens array having a plurality of first lenses and a pitch $\Delta w_1$ is present between the illumination system and the picture display panel, and a second microlens array having a plurality of second lenses and a pitch $\Delta w_2$ is present between the first microlens array and the picture display panel, while the focal planes of the microlens arrays coincide and $\Delta w_1 = \Delta w_2 = \Delta w$ applies to the pitches.

The picture display devices concerned may be subdivided into two types, namely, image projection devices and flat-panel picture display devices. An image projection device is a device in which a picture generated by means of a picture display panel is imaged by means of a projection lens system at a relatively large distance and in a magnified form on a projection screen. In a flat-panel picture display device, a picture is also generated by a picture display panel. The dimension in the direction transverse to the picture display panel is relatively small, much smaller than that of an image projection device. With a flat-panel picture display device, a viewer directly watches the picture display panel so that this device may also be referred to as a direct-vision device.

The picture display device may be, for example, a video display device or a monitor of a computer system, or the display device of an instrument panel.

A picture display device of the type described in the opening paragraph is known from, for example, the English language abstract of JP-A 2-262185. The picture display device described in this Application is provided with two microlens arrays which are present at the illumination side of a liquid crystalline picture display panel. The picture display panel comprises a matrix of pixels consisting of an active part, which actually switches, and a passive part. The focal planes of the two microlens arrays coincide and the microlens arrays have the same pitch. The light beam which is incident on the first microlens array is split up into a plurality of sub-beams corresponding to the number of pixels. The microlenses of the second array have a smaller dimension than the lenses of the first array so that the dimension of a sub-beam at the area of the picture display panel substantially corresponds to the dimension of the active part of the corresponding pixel. The number of microlenses per array is equal to the number of pixels of the picture display panel, with each microlens illuminating one pixel.

A drawback of the picture display device described in JP-A 2-262185 is that the throughput of the device is limited, inter alia, by the geometrical aperture of the picture display panel. The throughput characterizes the capability of an optical system to transport radiation energy. This capability is determined by the combination of a geometrical aperture and the pupil at one and the same position in the optical system and may be expressed as the product of the surface of the aperture and the spatial angle subtended by the pupil in the center of the aperture.

The geometrical aperture of a picture display panel is determined by the ratio between the surfaces of the active pixel portions and the surfaces of the passive pixel portions. In present-day LCD projection systems, the aim is miniaturization for reasons of, inter alia, reducing the cost price. This means that, inter alia, the picture display panels should be reduced in size, while maintaining resolution and throughput is desirable in most cases.

By reducing the size of the picture display panels, while maintaining the resolution, the geometrical aperture of the picture display panels will decrease. As a result of this limited geometrical aperture, considerable losses of light may occur in a picture display device with a liquid crystalline material, so that the light output of the device is influenced detrimentally.

When it is desirable to maintain the throughput in the device, the acceptance angle of a picture display panel which is reduced in size will be larger. Consequently, the microlenses should be located closer to the liquid crystalline material so as to be able to utilize as much light as possible from the illumination system. This means that the substrate thickness will have to be smaller. However, the thickness of the substrates of the picture display panel, between which the liquid crystalline material is present, should have a minimum value to make it suitable for handling without a considerable risk of damage. This thickness can thus not be reduced without further measures. Due to the requirement imposed on the substrate thickness, the acceptance angle and thus also the throughput is fixed for a given pixel format.

It follows from the foregoing that the pixels of the picture display panel cannot be reduced to an unlimited extent if an acceptable throughput and resolution should still be realized.

SUMMARY OF THE INVENTION

It is an object of the invention to provide a picture display device having a relatively high throughput which is not limited by the geometrical aperture of the picture display panel and by the thickness of the substrates of the picture display panel.

To this end, the first lenses have dimensions which are substantially equal to the dimensions of the second lenses, and the illumination system is adapted in such a way that the illumination system, when in operation, supplies a plurality of sub-beams which are incident on the first microlens array at different, well-defined angles.

The invention is based on the recognition that the angle at which the light cones leave the pixels of the picture display panel can be controlled by illuminating the pixels of the picture display panel from more than one microlens of the second microlens array. This may be realized by illuminating the microlenses of the first microlens array in a given manner and by positioning and dimensioning the microlenses of the first and the second microlens array in a given manner relative to one another.

This is achieved by ensuring that the light supplied by the illumination system is incident on the first microlens array at well-defined angles without light coming from the light source being lost, and that the microlenses of the second microlens array are given the same pitch and the same dimensions as those of the first microlens array. At most a part of a microlens of the second microlens array is illuminated by each microlens of the first microlens array. Each microlens of the second microlens array receives light from more than one microlens of the first microlens array. Consequently, the second microlens array is seen by the picture display panel as a fully radiating plane, rather than as a plane having discrete radiating faces as described in said Abstract. Each pixel of the picture display panel will be irradiated with a uniform light cone and the contrast will be equal for all pixels. Each pixel receives light from a plurality of contiguous microlenses of the second microlens array, which plurality is determined by the value of the angles at which the first microlens array is irradiated. In this way, the substantially complete acceptance angle of a pixel may be filled up with light, so that a relatively high throughput can be achieved and the thickness of the substrates no longer plays a role.

These measures have an additional advantage in a color picture display device. In this way, the colors are evenly distributed across the picture so that a color shift to one of the primary colors is prevented.

According to a preferred embodiment, the magnification M of the second microlens array is substantially equal to $\Delta x/\Delta w$, in which $\Delta x$ is the beam diameter per pixel at the area of the picture display panel, for which it holds that $\Delta x \approx 1/n$ P and $\Delta w \approx n.\Delta x$, with n being an integer $\geq 2$ and P being the pitch of the picture display panel.

Since it holds for the magnification M that $M \approx \Delta x/\Delta w$ and that $\Delta x \approx 1/n$ P and $\Delta w = n.\Delta x$, in which P is the pitch of the picture display panel, $\Delta x$ is the beam diameter at the location of the pixels of the picture display panel and n is an integer and $n \geq 2$, the image of a microlens of the first microlens array by a microlens of the second microlens array will match a pixel portion. The pixel portion is an active pixel portion, provided that the first microlens array is irradiated at a suitable angle. While maintaining the throughput, a minimum panel dimension is obtained for pixels having an aperture which is substantially equal to half the pitch of the picture display panel.

For example, n may equal 2. In that case, the dimensions of the passive pixel portions and the active pixel portions are equal to each other.

If the dimensions of the passive pixel portions and the active pixel portions are not equal to each other in the direction in which the different radiating sub-surfaces extend, in other words, if $\Delta x \neq \frac{1}{2}$ P, the magnification M may be adapted in such a way that the beams are still incident on the active pixel portions. If the active pixel portions are larger than the passive pixel portions, the magnification does not need to be adapted. The apertures in the picture display panel may be larger than the beam diameters at the location of the pixels. Then, there is an active portion of the picture display panel which does not contribute to the image formation, but this has its advantage in the production process. In fact, the position tolerance of the active pixel portions will be larger.

According to a further embodiment, the illumination system comprises a beam-separating system and has a radiative surface located between the beam-separating system and the first microlens array and substantially perpendicularly to the optical axis of the picture display device, the radiative surface being divided into a plurality of radiating sub-surfaces.

Each radiating sub-surface has a different position with respect to the first microlens array. The light coming from different sub-surfaces will be incident on the first microlens array at different angles. The location of the radiating sub-surfaces in the radiative surface can be determined in the construction of the illumination system, particularly by the choice of the beam-separating system.

According to a further embodiment, the beam-separating system comprises a beam-separating element, and a first lens is present between the radiative surface of the illumination system and the first microlens array, the radiating sub-surfaces being located in the focal plane of said first lens.

By providing a lens, whose focal plane coincides with the radiative surface, the light of the radiating sub-surfaces is incident on the first microlens array at different angles. The radiative surface is seen by the microlens array as a radiative surface consisting of discrete sub-surfaces.

According to a further embodiment, the first lens is integrated with the first microlens array.

This saves an extra component and, moreover, the number of surfaces on which unwanted reflections may occur is reduced.

The radiating sub-surfaces need not be separated from each other but may also adjoin each other. An embodiment of the picture display device according to the invention, in which the sub-surfaces adjoin each other, is characterized in that the beam-separating system comprises a diffraction grating.

In this case, the above-mentioned first lens may be dispensed with. The angles at which the beams from the radiating sub-surfaces are incident on the first microlens array may be corrected by changing the direction of illumination of the diffraction grating.

According to a further embodiment, in which the radiating sub-surfaces adjoin each other, is characterized in that the beam-separating system comprises a hologram.

A hologram is particularly suitable for this application, because it is relatively easy to manufacture and its dimensions also contribute to the compactness of the device.

According to a further embodiment, the illumination system is adapted to radiate a plurality of successive radiation directions for radiating green, red and blue light.

If the picture display device is adapted for color display, the different colors of red, green and blue can be distributed on the radiating sub-surfaces. The sequence in which they succeed each other is not important. Per color, one or more radiating sub-surfaces may be provided, dependent on the required and/or desired color balance in the picture.

According to a further embodiment, a second lens for matched imaging of the sub-surfaces on the picture display panel is present between the beam-separating system and the first microlens array.

If the radiative surface already radiates with the same aspect ratio as that of the picture display panel, a window image of the radiative surface can be made on the picture display panel by means of an extra lens. In this manner, the light from the illumination system is utilized as efficiently as possible and a minimum quantity of light is obstructed outside the picture display panel.

According to a further embodiment, the second lens is divided into a number of sub-lenses, which number is equal to the number of sub-surfaces.

By dividing the second lens into a number of sub-lenses, small lenses which are jointly cheaper and/or lighter than one large lens are sufficient. Each sub-lens then produces a window image of one of the sub-surfaces.

According to an alternative embodiment of the picture display device according to the invention, which is notably suitable if the picture display device is an image projection device, the beam-separating system comprises a prism system which is constituted by two color-separating prisms and a further number of prisms to change the direction and position of the beam, the sub-surfaces to be supplied by the prism system are located in the radiative surface of the illumination system.

In spite of its size, the prism system has the advantage that the allocation of one or more sub-surfaces per primary color and the dimensions of the sub-surfaces are very easy to manipulate.

According to a further embodiment, the exit faces of the prisms supplying a beam which gives rise to a sub-surface in the radiative surface are provided with a filter for spectrally obstructing or suppressing the color supplied by said prism.

In this way, a color compensation is performed so that color homogeneity in the image will be achieved.

According to a further embodiment, the two microlens arrays are arranged at both sides of a common substrate.

The number of surfaces on which unwanted reflections may occur is also reduced by this measure.

According to a further embodiment, the microlenses of the first and/or of the second microlens array are implemented as holographic elements.

Each microlens array may be implemented as an array of holographic elements each fulfilling the function of a lens.

These and other aspects of the invention will be apparent from and elucidated with reference to the embodiments described hereinafter.

DETAILED DESCRIPTION OF THE PREFERRED EMBODIMENTS

Figure 1:
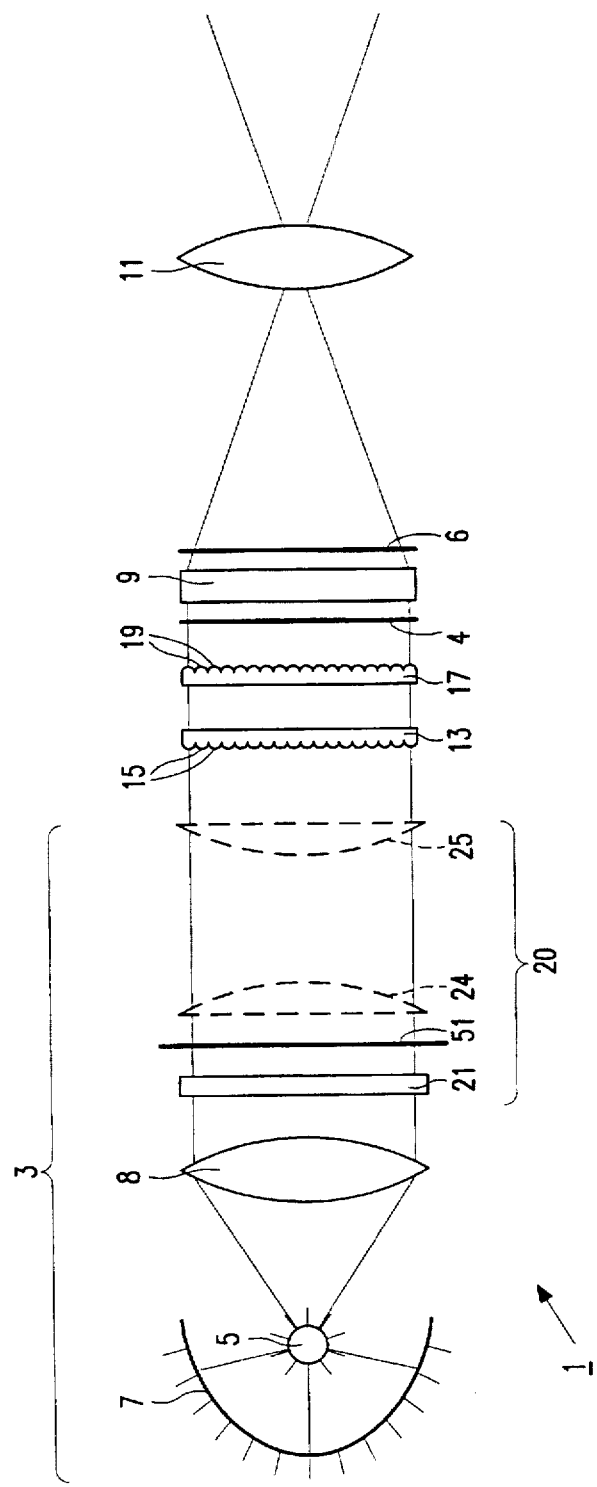
FIG. 1 shows an embodiment of an image projection device according to the invention.

The image projection device 1 shown in FIG. 1 comprises an illumination system 3 for supplying a light beam. The illumination system 3 comprises a light source 5 which is at least partly surrounded by a reflector 7 ensuring that a maximum quantity of light from the light source 5 reaches the picture display device. The reflector 7 may be, for example, a spherical reflector. The illumination system 3 further comprises a condensor lens 8 for forming a collimated beam. The reflector 7 may alternatively be a parabolic reflector. In this case, the condensor lens may be dispensed with, because the parabolic reflector already collimates the beam.

The image projection device 1 also has a picture display panel 9. The picture display panel 9 may comprise, for example, a liquid crystalline material and a matrix of pixels 10 whose operation is based on the twisted-nematic (TN), the super twisted-nematic (STN) or the ferroelectric effect so as to modulate the polarization direction of light incident thereon in conformity with picture information to be displayed. On the other hand, the operation of the picture display panel may also be based on scattering of incident unpolarized light such as, for example, in a polymer-dispersed liquid crystal (PDLC). In all these cases, the layer of liquid crystalline material is provided, for example, between two optically transparent substrates, for example, of glass or synthetic material on which an electrode structure is arranged to provide each pixel with picture information to be displayed.

If the operation of the picture display panel is based on the modulation of the polarization direction, a polarizer 4 is arranged just in front of the picture display panel 9 for polarizing the unpolarized light from the light source 5 before it is incident on the picture display panel 9. An analyzer 6 for obstructing the light, which gives rise to dark picture portions, is arranged behind the picture display panel 9. The polarizer 4 need not be arranged just in front of the picture display panel but may alternatively be arranged somewhere else in the light path between the light source and the picture display panel.

The light beam supplied by the illumination system 3 is modulated by the picture display panel in conformity with the picture information to be displayed. The modulated beam is subsequently projected to an image by a projection lens system 11 which is shown by way of a single projection lens for the sake of simplicity.

Each pixel 10 comprises an active portion 12, which actually switches, and a passive portion 14. The ratio between the active and passive portion per pixel defines the geometrical aperture of the picture display panel. Due to a limited aperture, the losses of light may be considerable in a picture display device employing a liquid crystalline picture display panel. For this reason, use is often made of a microlens array arranged in the light path between the illumination system and the picture display panel so as to concentrate a maximal quantity of light from the illumination system on the active portions of the pixels of the picture display panel. The focal plane of the microlens array is then situated in the liquid crystalline layer of the picture display panel. One of the drawbacks of a single microlens array is that there is a relatively large angular spread of the light rays leaving the picture display panel. For this reason, a second microlens array for reducing the angular spread is arranged between the first microlens array and the picture display panel. In the picture display devices hitherto known, using two microlens arrays in front of the picture display panel, the pitch is the same for the two microlens arrays, but the microlenses of the second microlens array have smaller dimensions than the microlenses of the first microlens array. In fact, the dimensions of the microlenses of the second microlens array are chosen to be such that the diameter of the beams from the microlenses of the second microlens array matches the active pixel portion of the pixels corresponding to the microlenses as satisfactorily as possible.

In the picture display device according to the invention, shown in FIG. 1, a first microlens array 13 comprising first microlenses 15 and a second microlens array 17 comprising lenses 19 are arranged between the illumination system 3 and the picture display panel 9. The pitch $\Delta w_1$ of the first microlens array 13 and the pitch $\Delta w_2$ of the second microlens array 17 are substantially equal and will further be referred to as $\Delta w$ for the sake of simplicity. The focal plane of the first microlens array and the focal plane of the second microlens array coincide, in order that a parallel beam which is incident on the first microlens array 15 leaves the second microlens array 17 as a parallel beam again. In the picture display device according to the invention, the first microlenses 15 and the second microlenses 19 have equal dimensions. The second microlens array 17 images the first microlens array 13 on the liquid crystalline layer of the picture display panel 9. The illumination system 3 is further implemented in such a way that the first microlens array is irradiated by a number of beams which are incident on the first microlens array at different, well-defined angles. These measures are based on the recognition that the angle at which the light cones leave the pixels of the picture display panel can be controlled by illuminating the pixels of the picture display panel from more than one microlens of the second microlens array. One way of realizing this is to ensure that a radiative surface composed of a number of juxtaposed radiating sub-surfaces is formed in a plane perpendicular to the optical axis of the picture display device. Since each of these sub-surfaces has a different position with respect to the first microlens array 13, radiation which comes from different sub-surfaces will be incident on the first microlens array 13 at different angles. A radiative surface comprising different radiating sub-surfaces may be realized in different manners. The embodiment of the illumination system determines the location of these sub-surfaces and, consequently, the angles at which the first microlens array 13 is irradiated.

It is achieved by the above-mentioned measures that the complete surface area of the second microlens array 17 is seen as a radiating surface by the picture display panel. This is in contrast to the picture display devices hitherto known. In these devices, the microlenses of the second microlens array are considered as discrete radiation areas. This has the drawback that the throughput of the device is limited by the geometrical aperture of the picture display panel. In the known devices, the diameter of the second microlenses is adapted to the dimensions of the active pixel portions. In the picture display device according to the invention, each pixel of the picture display panel 9 receives light via a number of microlenses of the second microlens array 17. This number is determined by the angles of incidence on the first microlens array 13.

Each microlens 19 of the second microlens array 17 images the microlenses 15 of the first microlens array 13 on at most a part of the liquid crystalline layer, preferably on the active pixel portions 12. To be able to clearly illustrate the radiation path, the microlenses 15 of the first array 13 are denoted by $l_{i+n}$, the microlenses 19 of the second microlens array 17 are denoted by $m_{i+n}$ and the pixels 10 of the picture display panel 9 are denoted by $p_{i+n}$, in which n is an integer. Microlenses which correspond to each other, i.e. those which are located on the same horizontal axis in the Figure, have the same index. However, one or more pixels may correspond to each microlens $l_i$ and $m_i$. In the embodiments of FIGS. 2a to 2d, each microlens corresponds to three pixels, referred to as a triplet. For example, it can be ensured that each pixel of the triplet is illuminated with a different primary color by causing three color beams to be incident on the first microlens array at suitable angles. A color picture display device is obtained in this way. The advantage of a device in which more than one pixel corresponds to a microlens, irrespective of the fact whether the device is intended for monochrome display or color display, is that the microlenses of the microlens arrays may be somewhat larger. This facilitates their manufacture, which is particularly advantageous in picture display devices using picture display panels which have relatively small pixels.

FIGS. 2a to 2d illustrate the paths of radiation for a number of different angles of incidence of a parallel beam which is incident on a microlens $l_i$. Three pixels 10 correspond to each microlens 19 of the second microlens array 17.

Figure 2A:
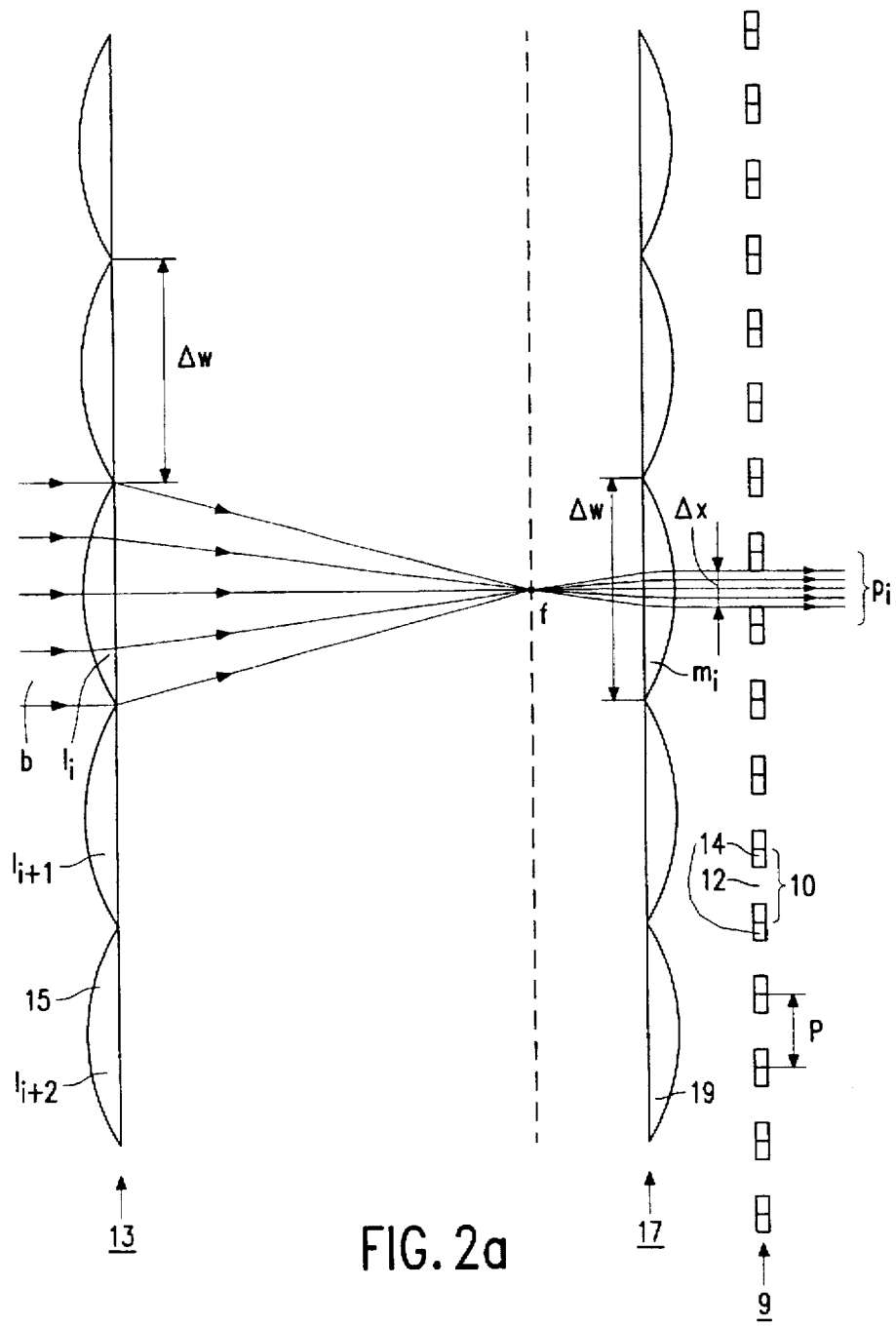
FIGS. 2a, 2b, 2c and 2d show the microlens arrays and the picture display panel of a picture display device according to the invention, in which the paths of radiation are illustrated for four light beams each being collimated and incident at different angles on a microlens of the first microlens array, each lens of the second microlens array corresponding to three pixels.

In FIG. 2a, the chief ray of the parallel, incident beam b is perpendicular to the microlens $l_i$. The microlens $l_i$ focuses the beam at the point f. The beam is subsequently converted by the second microlens $m_i$ into a parallel beam having the same dimension as the active pixel portion 12 of the pixel $p_i$. The beam lands on the active pixel portion 12 of the pixel $p_i$ as a result of the angle at which this beam is incident on the first microlens array. This happens when M≈Δx/Δw, in which Δx is the diameter of the beam at the area of the picture display panel. Δx may be equal to ½ P, in which P is the pitch of the picture display panel. In that case, the dimensions of the active pixel portions and the passive pixel portions are equal to each other. Δw is the pitch of the microlens arrays and is preferably substantially equal to n.Δx, with n being an integer which is larger than or equal to 2. In this example, n=6.

It is apparent therefrom that the minimum panel dimension at which the throughput can be maintained is obtained if the active pixel portion has a dimension which is equal to half the pitch P of the picture display panel. If the active pixel portion is larger than ½ P, a part thereof will not be utilized. The advantage of such a picture display panel is that the position tolerance of the active pixel portions is larger.

Figure 2B:
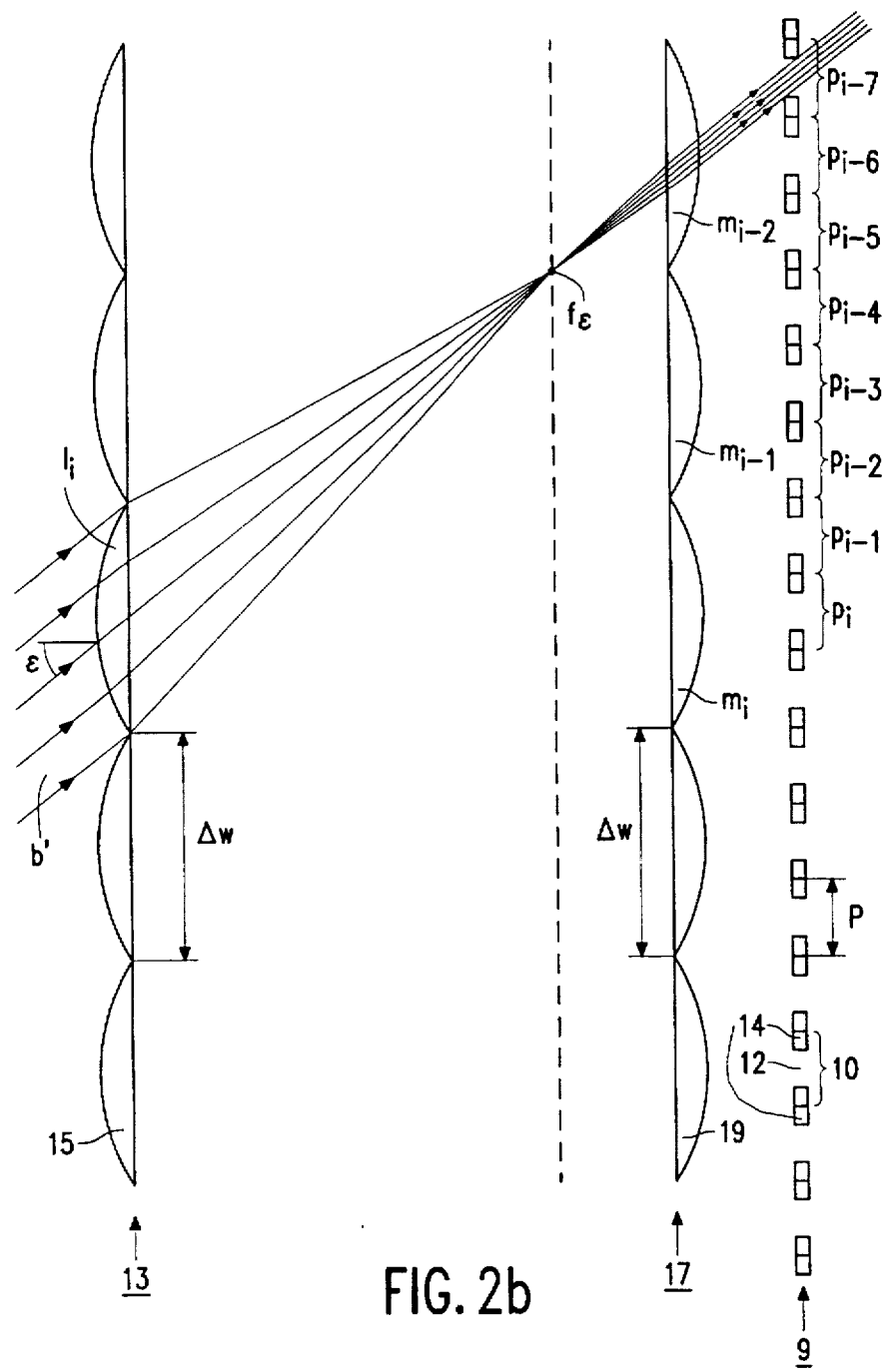

FIG. 2b shows that a parallel beam b' incident at an angle ε with respect to the normal on the microlens $l_i$, is focused by this microlens at the point $f_\epsilon$ and reaches the active pixel portion 12 of pixel $p_{i-7}$ via the microlens $m_{i-2}$.

Figure 2C:
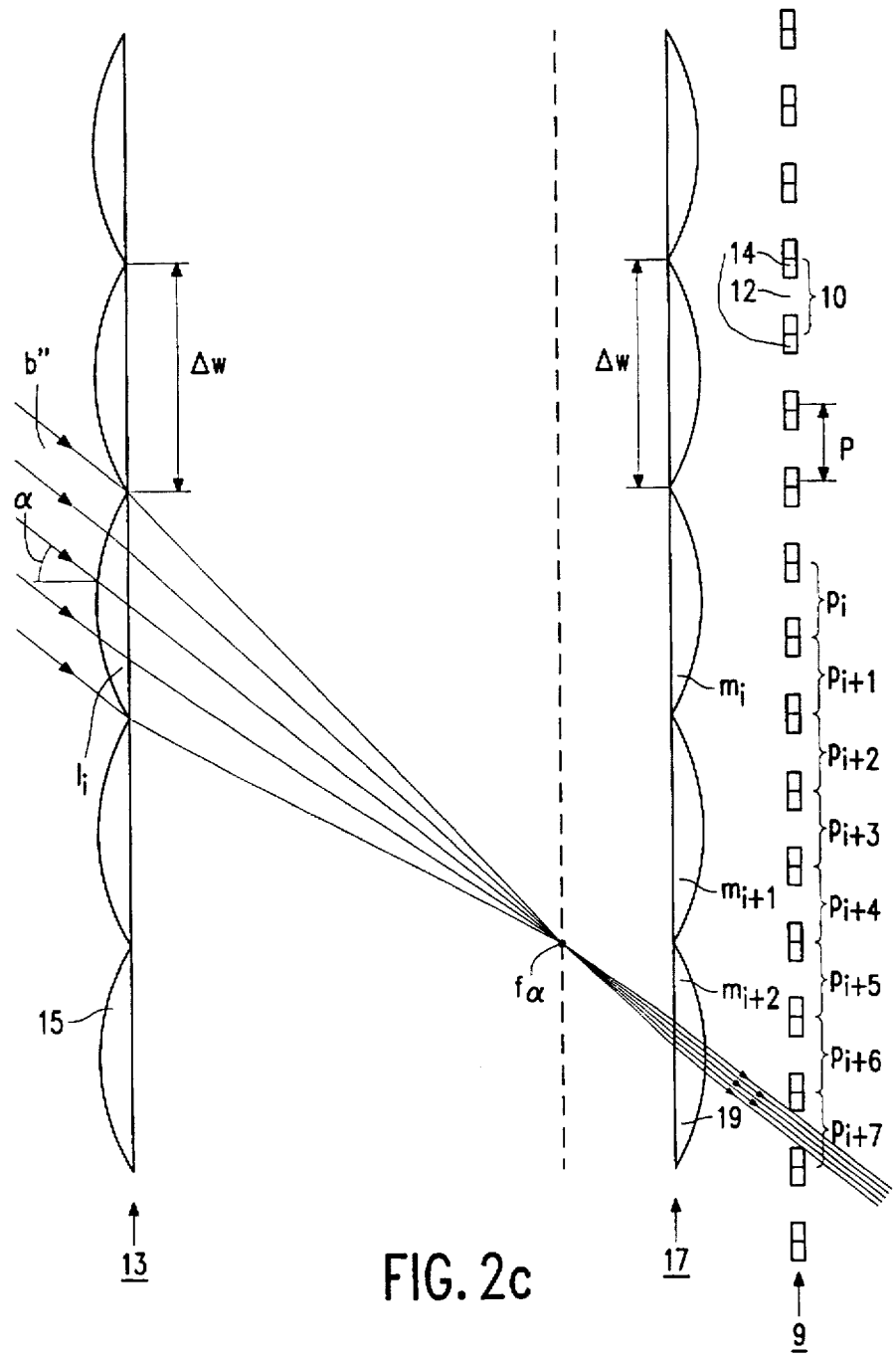

A parallel beam b" which is incident at an angle α with respect to the normal on this microlens $l_i$ will be focused by this microlens at the point $f_\alpha$ and reach the active portion 12 of the pixel $p_{i+7}$ via microlens $m_{i+2}$. This is shown in FIG. 2c.

Figure 2D:
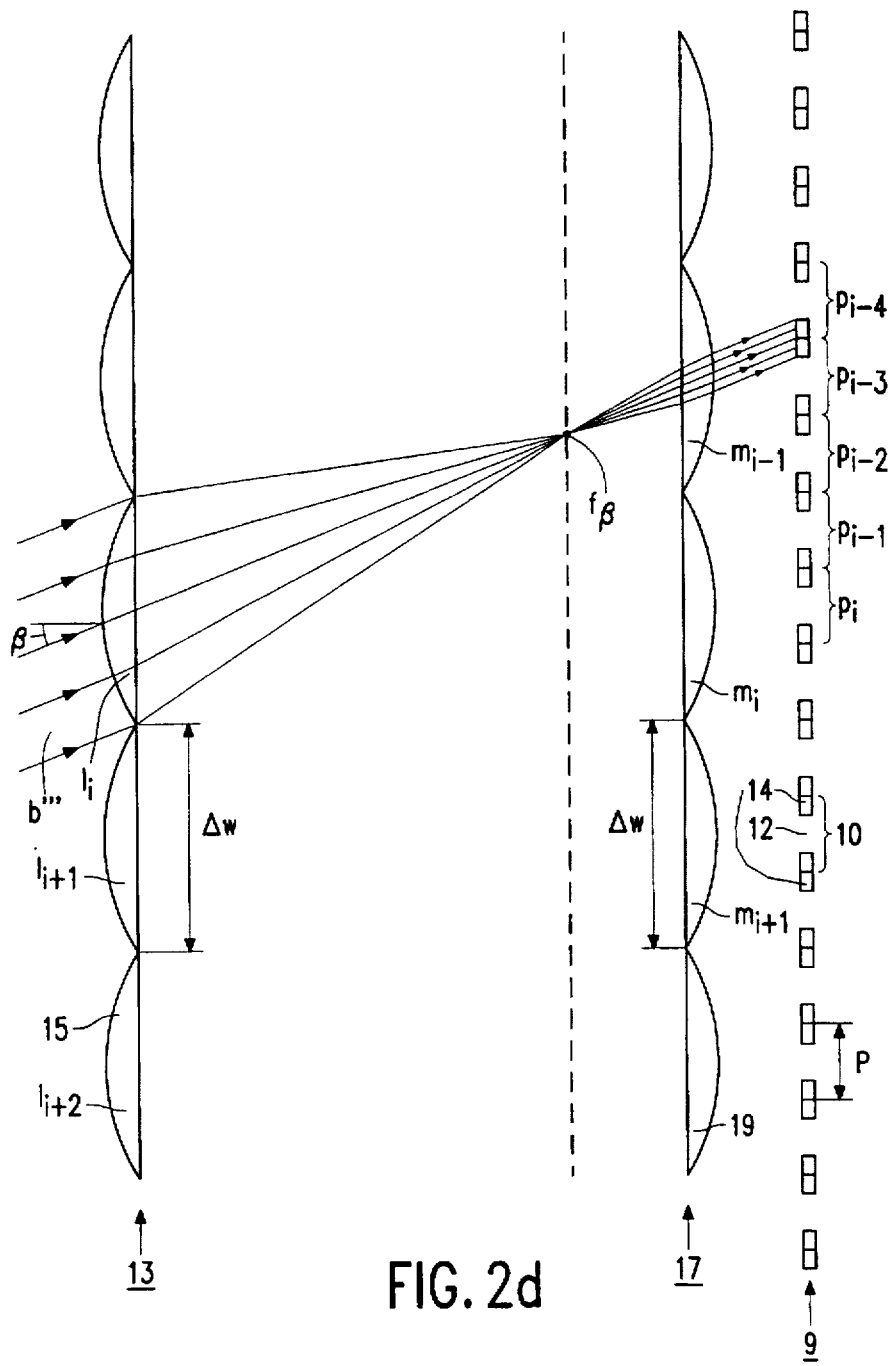

The beam incident on the microlens $l_i$ may, however, also be incident at such an angle that the beam is incident on a passive pixel portion 14 of the display panel. However, this should be avoided because light which is incident on the passive pixel portions cannot contribute to the formation of the picture and results in loss of light and heating of the panel. This notably applies to light rays which are incident on the picture display panel from a microlens $l_i$ via a microlens $m_{i+1+2k}$, in which k is 0,±1,±2, . . . . . An example is shown in FIG. 2d. The beam b''' is incident at an angle β on a microlens $l_i$ and is subsequently focused at a point $f_\beta$. The beam then reaches the passive pixel portions 14 of the pixels $p_{i-3}$ and $p_{i-4}$ via microlens $m_{i-1}$. The lens $l_{i+1}$ will be imaged by $m_i$ on a passive pixel portion. $l_{i+2}$ will then be imaged again on an active pixel portion.

It is apparent from the foregoing that, when a parallel beam is incident on a microlens 15 of the first microlens array 13 at a given angle, this beam will leave the picture display panel 9 as a parallel beam again at an angle which corresponds to the angle of incidence. An angle of incidence thus corresponds to an exiting angle. The exiting angles may consequently be chosen to be such that there is no loss of light. For smaller pixels, the acceptance angle increases so that the angle at which light may be incident on the pixels to be able to contribute to the formation of the picture increases. By filling the allowed acceptance angle, the device will still have a relatively high throughput in spite of a relatively small geometrical aperture of the pixels. Since the acceptance angle of a pixel is filled up with light beams from different microlenses, the thickness of the substrates of the picture display panel will no longer be important.

A microlens 19 of the second microlens array 17 may illuminate three pixels in the example shown in FIGS. 2a to 2d, namely the three pixels which correspond to this microlens. A microlens 15 of the first microlens array 13 will irradiate different microlenses 19 of the second microlens array 17, and hence different pixels. The number of pixels that can be reached is determined, inter alia, by the magnitude of the spread of the angles within the beam incident on the first microlens array. By causing different beams each consisting of parallel light rays to be incident on one microlens 15 of the first microlens array 13 at different angles, different pixels can thus be irradiated. Moreover, each pixel will receive light from more than one microlens of the first microlens array. A light beam consisting of parallel light rays, which beam is incident on one well-defined microlens 15 of the first microlens array 13, will be incident on one pixel of the picture display panel.

Figure 3A:
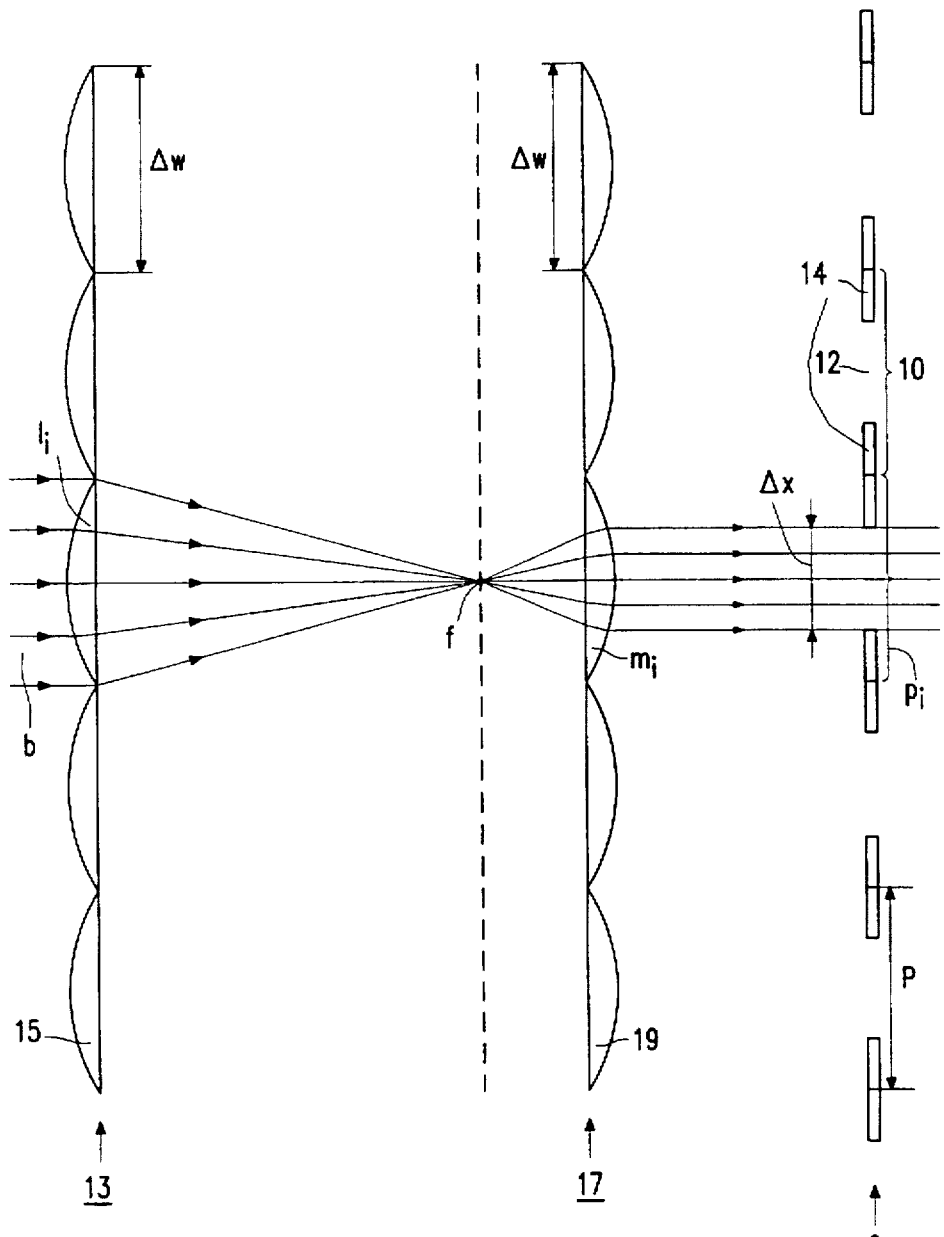
FIGS. 3a, 3b, 3c and 3d show the microlens arrays and the picture display panel of a picture display device according to the invention, in which the paths of radiation are illustrated for four light beams each being collimated and incident at different angles on a microlens of the first microlens array, each lens of the second microlens array corresponding to one pixel.
Figure 3B:
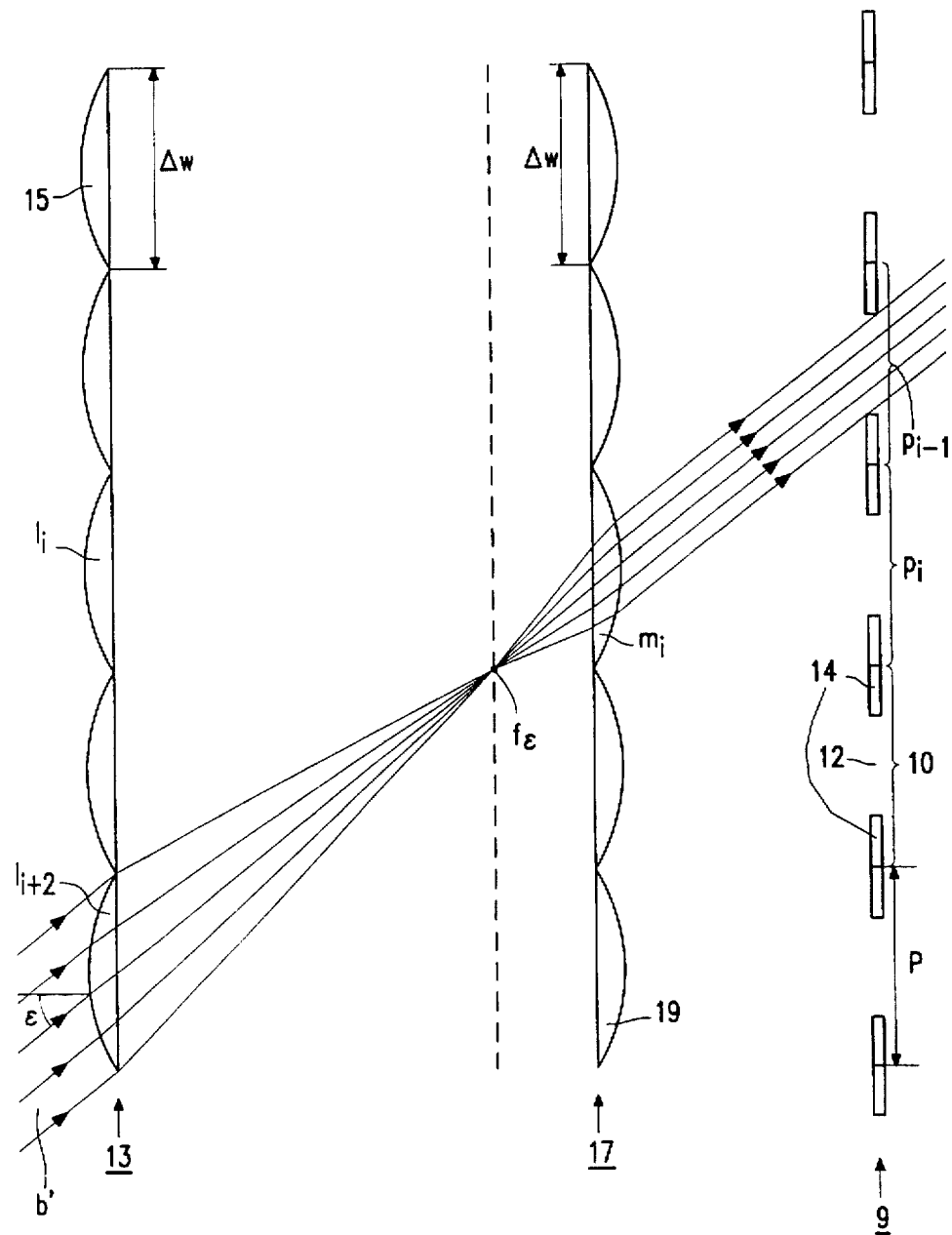
Figure 3C:
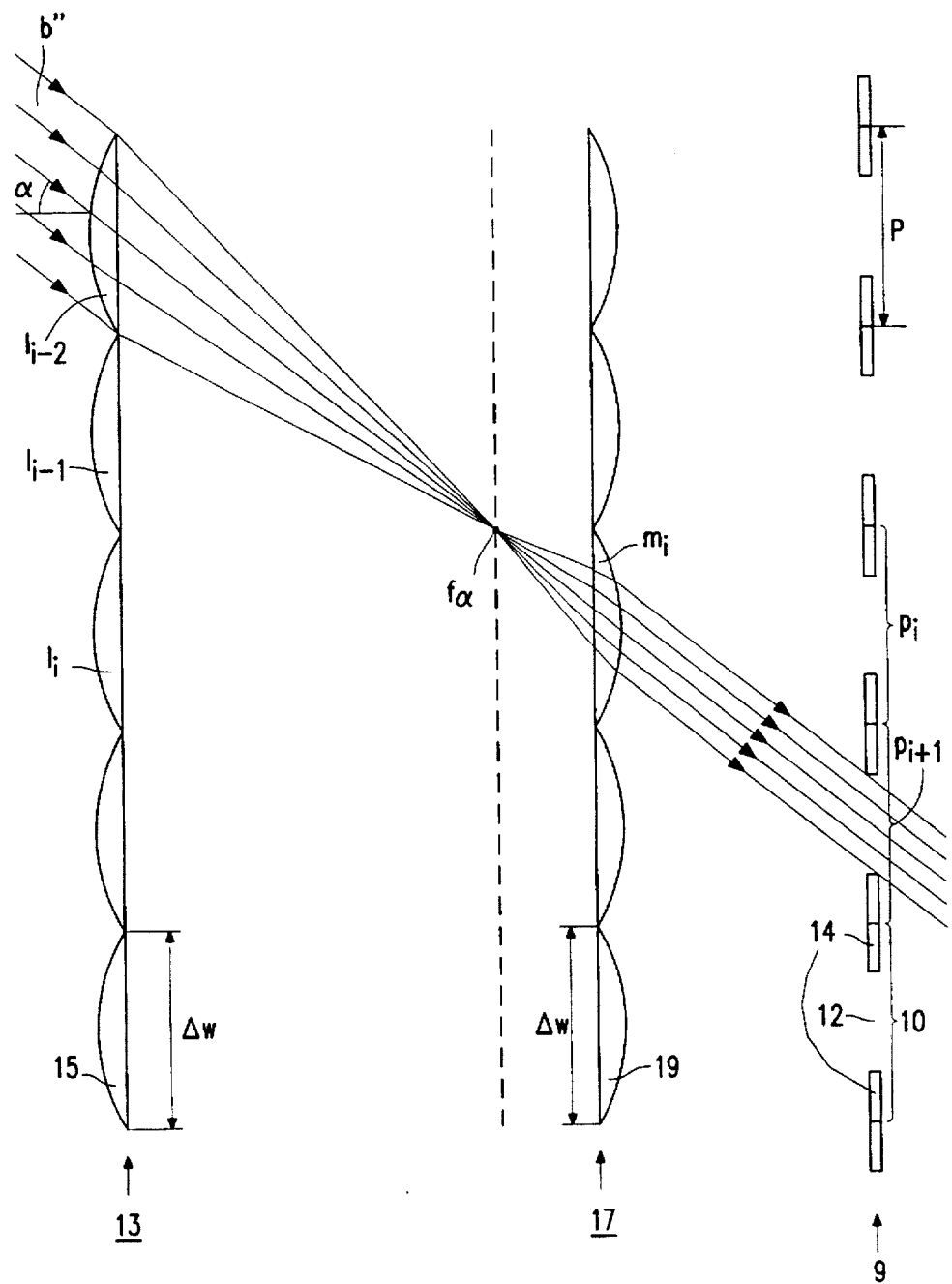
Figure 3D:
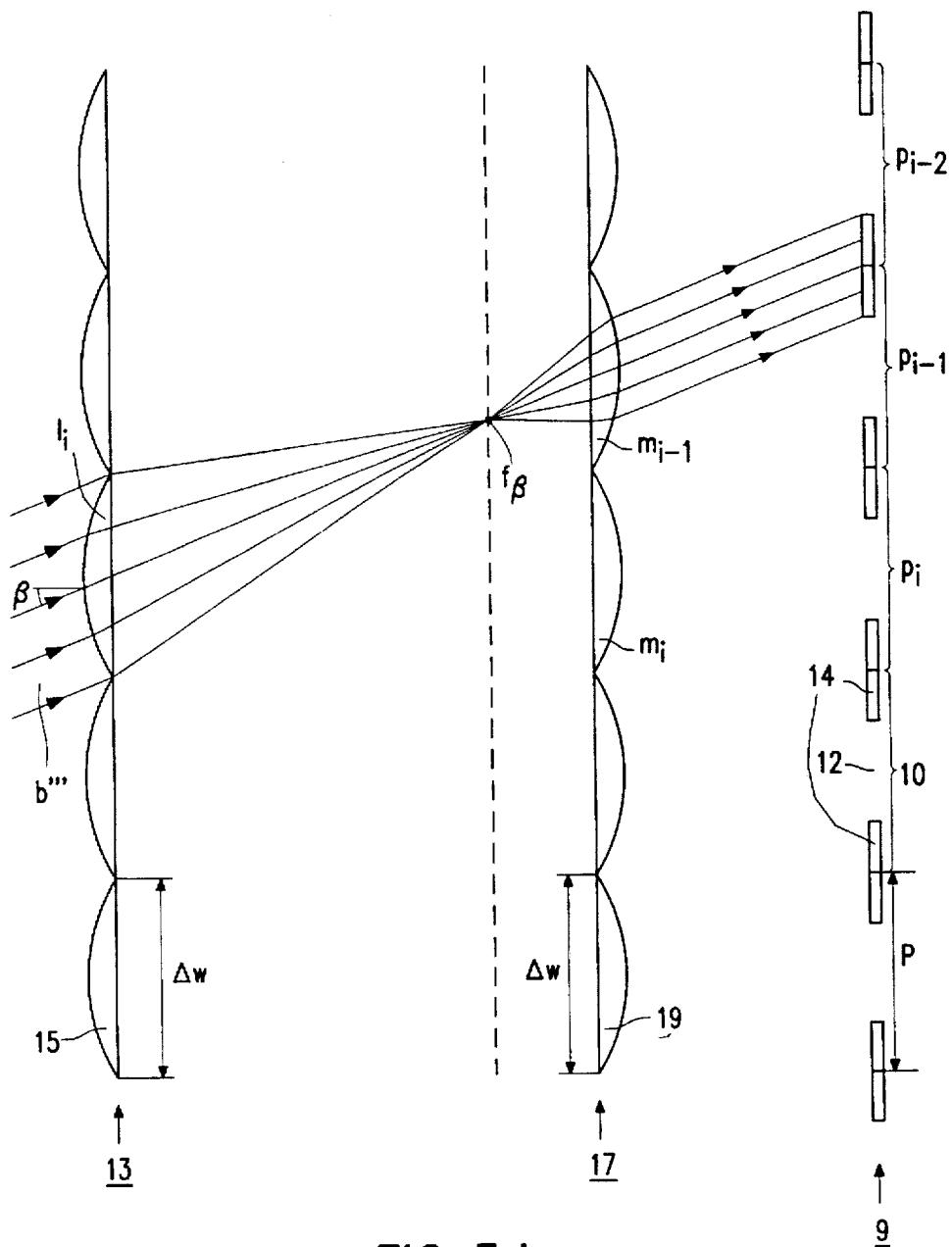

Analogous to FIGS. 2a to 2d, FIGS. 3a to 3d show the paths of radiation if only one pixel 10 corresponds to each microlens 19 of the second microlens array 17. Here again, $\Delta x = \frac{1}{2} P$. In this case, n=2. In FIG. 3a, a beam b is perpendicularly incident on microlens $l_i$ and reaches the active pixel portion 12 of pixel $p_i$ via microlens $m_i$. In FIG. 3b, a beam b' is incident on microlens $l_{i+2}$ at an angle $\epsilon$ and reaches the active pixel portion 12 of pixel $p_{i-1}$ via microlens $m_i$. In FIG. 3c, a beam b" is incident on microlens $l_{i-2}$ at an angle $\alpha$ and is imaged on the active pixel portion 12 of pixel $P_{i+1}$ via microlens $m_i$. In FIG. 3d, a beam b''' is incident on microlens $l_i$ at an angle $\beta$ and reaches the passive pixel portions 14 of the pixels $p_{i-1}$ and $p_{i-2}$ via microlens $m_{i-1}$.

For example, two pixels may also correspond to each microlens of the second microlens array. If $\Delta x = \frac{1}{2} P$ again, then n=4.

Figure 4:
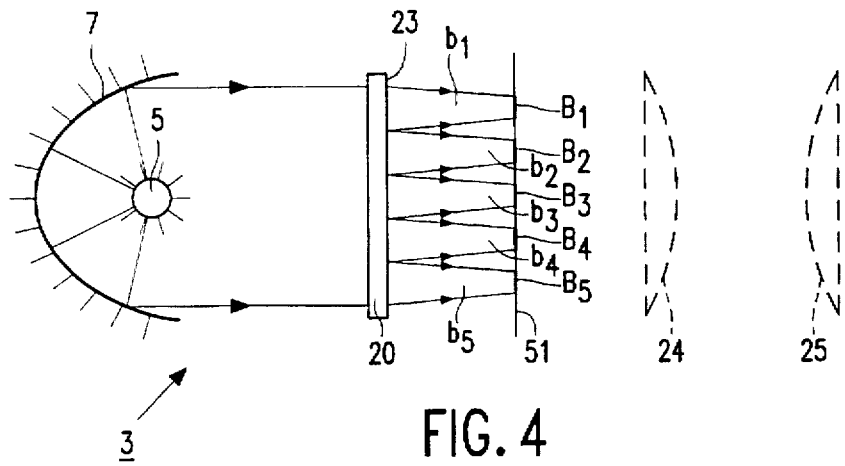
FIGS. 4 and 5 show two embodiments of an illumination system for a picture display device according to the invention.

The desired spread of angles in the beam incident on the first microlens array 13 is obtained, for example, by means of an illumination system 3 as shown in FIG. 4. The illumination system 3 comprises a light source 5, a reflector 7 which at least partially surrounds the light source 5, a beam-separating system 20, at the output face of which different sub-beams $b_j$, with j=1, ..., 5, are formed. These beams $b_j$ give rise to sub-surfaces $B_j$ located in a radiative surface 51. The beam-separating system 20 includes a beam-separating element (not shown).

The beam-separating element may be, for example, a flat apertured plate. The location of the apertures in the plate is determined by the angles at which the first microlens array is to be irradiated. An incident "white" beam will be separated into a plurality of "white" sub-beams by such a plate. In this case, a first lens 25 should be present proximate to the first microlens array 13 between the radiative surface 51 and the first microlens array 13. The focal plane of this first lens 25 coincides with the radiative surface 51. The first lens 25 ensures that the radiative surface 51 is converted into a completely filled illumination face which illuminates the microlens array and in which only the desired illumination angles are represented. This first lens 25 may be implemented as a separate component, but may also be integrated with the first microlens array 13 so that this saves an extra component. Moreover, a second lens 24 may be arranged between the first lens 25 and the radiative surface 51, proximate to the radiative surface 51. It can thereby be realized that the light cones radiated by each point of the radiative surface each illuminate the total picture display panel. The second lens 24 may consist of one piece but may alternatively be formed by a plurality of sub-lenses. The number of sub-lenses will then correspond to the number of sub-surfaces formed in the radiative surface 51. The advantage of using a number of sub-lenses is that smaller lenses are less expensive and/or lighter than one big lens. The lenses 24 and 25 are shown in a broken line in FIG. 1, because they are optional. The lenses 24 and 25 may be considered to be a part of the illumination system 3.

The beam-separating element may alternatively be a diffraction grating or a hologram. A "white" beam incident thereon will be separated into colored sub-beams, for example, sub-beams having the primary colors of red, green and blue. The number of beams of each color is determined by the implementation of the hologram. If the beam-separating element is a hologram or a diffraction grating, the first lens 25 may be dispensed with. The directions in which the radiating sub-surfaces radiate light may be corrected by varying the direction of illumination of the diffraction grating or the hologram.

It is achieved by the location of the sub-surfaces $B_j$ in the radiative surface 51 and the lenses 24 and 25 that the first microlens array 13 is illuminated in such a way that substantially all the light supplied by the light source 5 reaches active pixel portions 12 of the picture display panel 9, while the acceptance angles per pixel 10 are filled as satisfactorily as possible.

Figure 5:
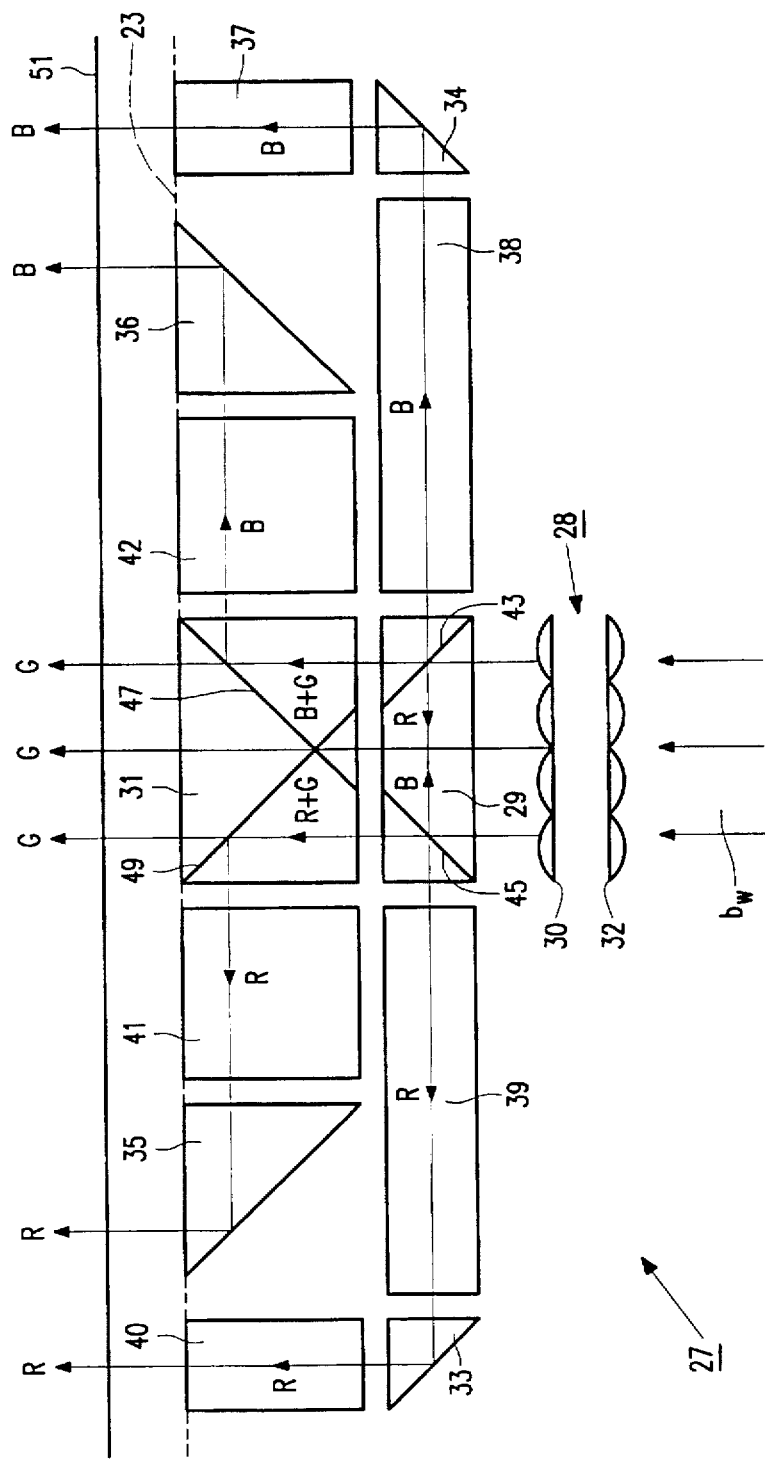

Another possibility of generating a number of sub-beams of the three primary colors is to make use of a system of prisms 27 as a beam-separating system, as is shown in FIG. 5. The prism system 27 comprises a first and a second color-separating prism 29 and 31, four 90° prisms 33, 34, 35, 36 and six elongated block form prisms 37, 38, 39, 40, 41 and 42. The distribution of light is preferably telecentric in each prism of the prism system 27, so as to ensure that the distribution of light in each intersecting plane remains equal. The function of the 90° prisms is to rotate the beam through 90° without the distribution of light across the cross-section of the light beam changing. The function of the elongated block form prisms is to displace the light beam in its direction of propagation without changing the distribution of light across the cross-section of the beam.

The first color-separating prism 29 is illuminated with the "white" beam $b_w$ from the light source. Viewed in the direction of propagation of this beam, the two color-separating prisms 29 and 31 are placed one behind the other. The first prism 29 incorporates, for example, a red dichroic mirror 43 and a blue dichroic mirror 45. Of the light which is incident on the red mirror 43, the red component is reflected to the left and the blue and the green components go straight on to the second color-separating prism 31. This prism 31 incorporates a blue dichroic mirror 47 in the light path of the blue and the green component which were passed by the mirror 43. The green component is passed by this mirror 47, while the blue component is reflected to the right. The blue component subsequently passes the elongated block form prism 42 and is deflected by the 90° prism towards the exit face 23 of the prism system 27 and possibly the radiative surface 51, if these faces 23 and 51 do not coincide. Of the light which is incident on the blue dichroic mirror 45 of the first prism 29, the blue component is reflected to the right, while the red and the green components are passed towards the second prism 31. The second prism 31 incorporates, in the light path of the red and the green component, a red dichroic mirror 49 which passes the green component towards the exit face 23. The red component is deflected to the left and passes via the elongated block form prism 41 to the 90° prism so that the red component is also deflected towards the radiative surface 51. The red and the blue dichroic mirrors 43, 45 and 49, 47 are oriented in such a way that the red and the blue beams separated thereby propagate in opposite directions. The red component reflected by the mirror 43 is passed by the mirror 45 and passes via the elongated block form prism 39, the 90° prism 33 and the elongated block form prism 40 to the exit face 23. The blue component reflected by the blue mirror 45 is passed by the mirror 43 to the elongated block form prism 38, the 90° prism 34 and the elongated block form prism 37 to the exit face 23.

The mirror of the first prism and the mirror of the second prism, which are coplanar, select the same color of light. The mirrors 43 and 49 select red, while the mirrors 45 and 47 select blue. An air gap for reflecting grazing light and passing perpendicularly incident light is present between two consecutive prisms. Consequently, the light distribution remains unchanged, also after reflection.

Figure 6:
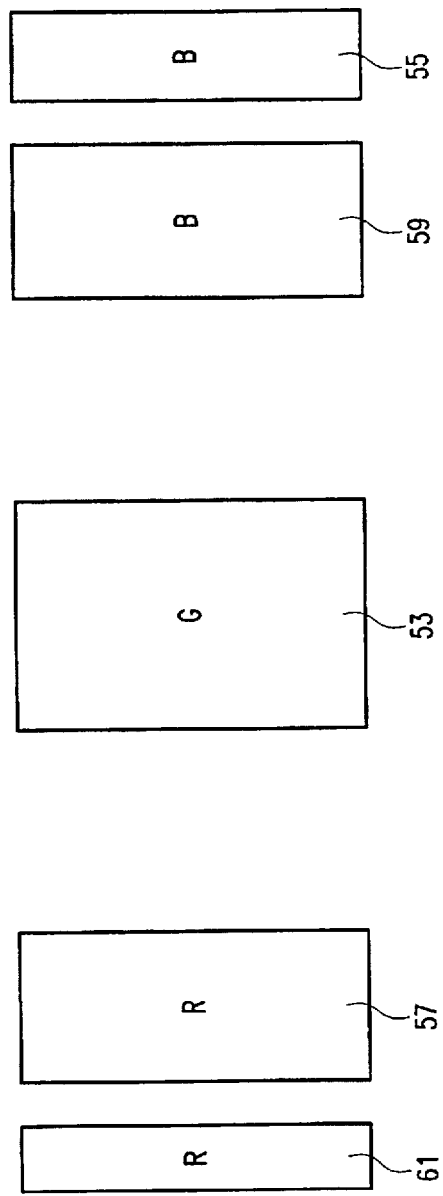
FIG. 6 shows the division of the radiative surfaces of an illumination system as shown in FIG. 5.

In the prism system 27 described here, five sub-surfaces $B_j$ distributed among the three primary colors are formed in the exit face 23 and in the radiative surface 51. The distribution of the colors across the sub-surfaces depends on the types of dichroic mirrors which have been arranged in the prisms. The dimensions of the sub-surfaces depend on the dimensions of the exit faces of the second color-separating prism 31, the two 90° prisms 35 and 36 and the two elongated block form prisms 37 and 40. FIG. 6 shows a possible division of sub-surfaces in the radiative surface 51 of a prism system 27 as shown in FIG. 5. In this Figure, the radiative surface 51 and the exit face 23 coincide with the plane of the drawing. A green sub-surface 53 is present in the center, while blue sub-surfaces 55 and 57 and red sub-surfaces 59 and 61, respectively, are present at both sides.

The color-separating prisms should be made of a transparent material having a higher refractive index than the surrounding medium so as to ensure internal reflection of grazing light. The material may be, for example, glass. If the light incident on the color-separating system is already polarized, all prisms should be made of a material having a low birefringence in order to prevent depolarization. The elongated block form prisms may be made of glass or a synthetic material. Instead of the elongated block form prisms, it is alternatively possible to use tunnels whose long side walls are provided with a reflecting coating.

It will be evident that a different choice of the dichroic mirrors in the color-separating prisms leads to a different sequence of the colors and different dimensions of the sub-surfaces in the radiative surface.

A telecentric illumination of the prism system 27 may be realized by providing an integrator system 28, for example, between the light source 5 and the prism system 27, which integrator system is known per se from U.S. Pat. No. 5,098,184. The integrator system described in this Patent comprises a first lens plate 30 and a second lens plate 32 having a corresponding number of lenses arranged in a matrix. Each lens images the light source on an associated lens of the second lens plate. For imaging the light source on the corresponding lenses of the second plate by means of the different lenses of the first plate, a different portion of the beam incident on the first lens plate is used each time. It is achieved by means of an integrator system that the illumination intensity in that plane has the desired uniformity. The extent of uniformity is determined by the number of lenses of the two lens plates. Moreover, an integrator system has the advantage that a light beam coming from the light source and having, for example, a circular cross-section, can be converted into a light beam having a rectangular cross-section whose aspect ratio corresponds to that of the picture display panel, for example, 4:3. The lenses of the two lens plates 30, 32 face away from each other in FIG. 5, but this is not a requirement.

If the picture display device according to the invention is adapted for color display, each pixel of each color has substantially the same acceptance angle. As a result, the filling per color is also substantially equal in the projection lens. Within the projection lens, each color will have the same pupil as far as shape and acceptance is concerned so that a simpler and hence cheaper projection lens is sufficient.

When determining the angles at which the first microlens array is to be irradiated, the acceptance of the projection lens plays an important role. Since each angle of exit from the picture display panel has a corresponding angle of incidence on the first microlens array, the acceptance of the projection lens determines the spread admitted for the exit angles of the light cones from the picture display panel and hence the maximum angles at which the light rays may be incident on the first microlens array.

Figure 7:
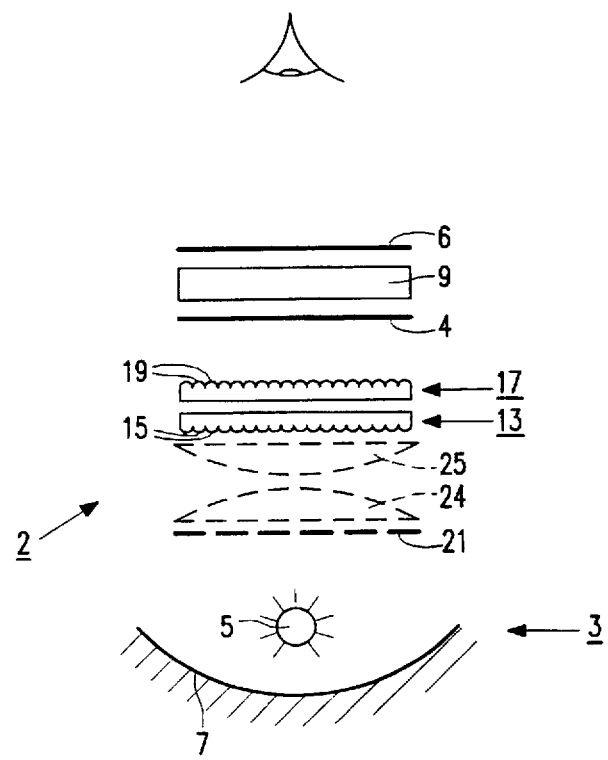
FIG. 7 shows an embodiment of a direct-vision picture display device according to the invention.

FIG. 7 shows an embodiment of a direct-vision picture display device according to the invention. The direct-vision device 2 comprises a light source 5, behind which a reflector 7 is present for passing the light facing away from the picture display panel 9 as yet towards the picture display panel 9. Similarly as in the image projection device 1 of FIG. 1, a polarizer 4 is present in front of the picture display panel 9 and an analyzer 6 is present behind the picture display panel 9 if the operation of the picture display panel 9 is based on modulation of the polarization direction of incident light. The first microlens array 13 and the second microlens array 17 are present between the picture display panel 9 and the illumination system. The beam-separating element 21 is present between the first microlens array 13 and the light source 5. In analogy with the image projection device described hereinbefore, the first microlens array 13 will be irradiated at well-defined angles in such a way that, with a minimal loss of light, the acceptance angles of the pixels of the picture display panel are filled up as satisfactorily as possible, so that the device has a relatively high throughput.

The flat plate with apertures or the hologram as an implementation of the beam-separating element 21 may be used in a direct-vision device as well as in an image projection device. Due to its dimensions, the implementation in the form of a prism system is notably suitable for use in an image projection device.

I claim:

1. A picture display device comprising an illumination system provided with a light source for generating a light beam, and a picture display panel having a matrix of pixels for modulating said light beam in conformity with picture information to be displayed, a first microlens array having a plurality of first lenses and a pitch $\Delta w_1$ being present between the illumination system and the picture display panel, and a second microlens array having a plurality of second lenses and a pitch $\Delta w_2$ being present between the first microlens array and the picture display panel, while the focal planes of said microlens arrays coincide and $\Delta w_1 = \Delta w_2 = \Delta w$ applies to the pitches, wherein the first lenses have dimensions which are substantially equal to the dimensions of the second lenses, and the illumination system comprises means for supplying a plurality of non-parallel sub-beams which are incident on the first microlens array at different, discrete angles so that each lense in said first microlens array directs a plurality of sub-beams to a plurality of lenses in said second microlens array.

2. A picture display device as claimed in claim 1, characterized in that the magnification M of the second microlens array is substantially equal to $\Delta x/\Delta w$, in which $\Delta x$ is the beam diameter per pixel at the area of the picture display panel, for which it holds that $\Delta x \approx 1/n\ P$ and $\Delta w \approx n.\Delta_x$, with n being an integer $\geq 2$ and P being the pitch of the picture display panel.

3. A picture display device as claimed in claim 1, characterized in that the illumination system comprises a beam-separating system and has a radiative surface located between the beam-separating system and the first microlens array and substantially perpendicularly to the optical axis of the picture display device, said radiative surface being divided into a plurality of radiating sub-surfaces.

4. A picture display device as claimed in claim 3, characterized in that the beam-separating system comprises a beam-separating element, and in that a first lens is present between the radiative surface of the illumination system and the first microlens array, the radiating sub-surfaces being located in the focal plane of said first lens.

5. A picture display device as claimed in claim 4, characterized in that the first lens is integrated with the first microlens array.

6. A picture display device as claimed in claim 3, characterized in that the beam-separating system comprises a diffraction grating.

7. A picture display device as claimed in claim 3, characterized in that the beam-separating system comprises a hologram.

8. A picture display device as claimed in claim 3, characterized in that the illumination system is adapted to radiate a plurality of successive radiation directions for radiating green, red and blue light.

9. A picture display device as claimed in claim 3, in which the radiating sub-surfaces are congruent with the picture display panel, characterized in that a second lens for matched imaging of the sub-surfaces on the picture display panel is present between the beam-separating system and the first microlens array.

10. A picture display device as claimed in claim 9, characterized in that the second lens is divided into a number of sub-lenses, which number is equal to the number of sub-surfaces.

11. A picture display device as claimed in claim 1, characterized in that the beam-separating system comprises a prism system which is constituted by two color-separating prisms and a further number of prisms to change the direction and position of the beam, the sub-surfaces to be supplied by the prism system being located in the radiative surface of the illumination system.

12. A picture display device as claimed in claim 11, characterized in that the exit faces of the prisms supplying a beam which gives rise to a sub-surface in the radiative surface are provided with a filter for spectrally obstructing or suppressing the color supplied by said prism.

13. A picture display device as claimed in claim 1, characterized in that the two microlens arrays are arranged at both sides of a common substrate.

14. A picture display device as claimed in claim 1, characterized in that the microlenses of the first and/or of the second microlens array are implemented as holographic elements.

* * * * *